G. S. G. SPENCE.
Domestic Boiler.
No. 29,414. Patented July 31, 1860.
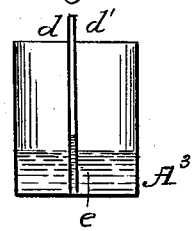
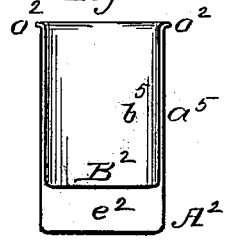
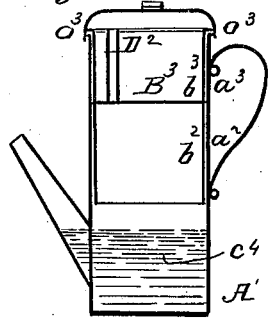
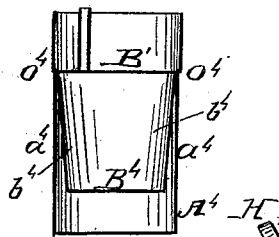
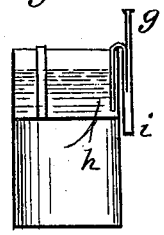
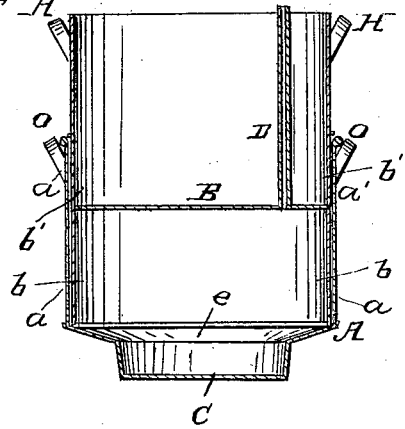
Witnesses:
G. G. Allen.
J. Tyssowski.
Inventor:
G. S. G. Spence
pr his attorney
L. D. Gale

UNITED STATES PATENT OFFICE.

GEORGE S. G. SPENCE, OF BOSTON, MASSACHUSETTS.

BOILING AND CONDENSING APPARATUS.

Specification of Letters Patent No. 29,414, dated July 31, 1860.

*To all whom it may concern:*

Be it known that I, G. S. G. SPENCE, of Boston, in the county of Suffolk and Commonwealth of Massachusetts, have invented a new Application for Use of the Principle of Capillary Attraction in Liquids to the Construction of Boilers of Every Kind; and I do hereby declare that the following is an exact description of the same, reference being had to the accompanying drawings, making a part of this specification.

The nature of the invention consists in the making of a boiler and condenser with parallel-double-sides in such a manner that the space between them shall be a capillary space to hold or sustain a liquid between the two sides, according to the laws of capillary attraction, and that such capillary space may be maintained continuously charged with a ring of liquid during the operation of the boiler, and that the liquid so maintained may act as a water joint to prevent the escape of steam or other vapors from the boiler through said capillary space.

To enable others skilled in the art to make and use my invention I proceed to describe it.

Let Figure 1, represent two plates of glass placed in a vessel of water, and Fig. 2, represent two beaker glasses one within the other, the outer one containing water in the bottom. Fig. 3, is a vertical section of a boiler designed to be used for cooking vegetables and meats. Fig. 4, exhibits a vertical section of a coffee-pot or tea-pot to be used in a similar manner. Fig. 5, represents the double sides, or side of a boiler and condenser not parallel with each other.

Similar letters refer to similar parts in the drawings.

The prominent feature of my invention depending on the peculiar construction of the devices used for condensing vapors upon capillary surfaces, it becomes necessary to explain and illustrate this attraction.

In Fig. 1, $d$ and $d'$ represent two planes or flat plates of glass placed vertically and parallel with each other in a vessel $A^3$ of colored water. The liquid ascends perceptibly between the two plates and the nearer the plates approximate, the higher the liquid rises; and if the plates diverge either from the top or from the bottom, the rise of the liquid between the plates will diminish, or disappear, according to the degree of divergence.

Fig. 2, consisting of one beaker glass within another, presents a capillary space between the sides of the inner and outer vessel, which sides are parallel to each other, and nearly in contact. It is evident now, if cold water be poured into the inner vessel and the water in the outer vessel be boiled that the vapor arising therefrom would tend to pass up between the inner and the outer vessel and out at the openings $o^2$; but from the fact that the inner vessel contains cold water and forms on the outside a condensing surface, and also from the fact that the outer surface of the outer vessel constantly radiates its heat to the atmosphere which also becomes a constant source of cooling, it follows that the steam which rises from the water ($e^2$) at 212° Fahrenheit, and which becomes water at a temperature anything less than 212° will, in ascending between the surfaces $b^5$ and $a^5$ necessarily be condensed to the liquid state and constitute a ring of liquid, which, acting as a water joint, will prevent the escape of steam at the openings ($o^2$, $o^2$); and if there were an air tube passing upward through the bottom, $B^2$, into the open air. The apparatus shown in Fig. 2, would constitute an effectual boiler, which would accomplish the work herein designed—namely, a boiler operating in a particular way to condense and return from the condenser to the boiler all the aroma of the boiled products. If, however, instead of using the apparatus shown in Fig. 2, that shown in Fig. 5 be adopted, where $A^4$, represents the boiler; ($e^3$), water; ($a^4$), the side of the boiler, and ($b^4$) the side of the extended flange projecting from the bottom of the condenser $B'$, it would necessarily result that ($a^4$) would be the only condensing surface that could contribute to form a ring of liquid between ($a^4$ and $b^4$) so as to prevent the escape of steam through the joint ($o^4$); and, since both of the surfaces ($a^4$, $b^4$) diverge from each other from the top downward, the condensed liquid following the line of these surfaces falls back into the liquid at the bottom of the boiler without forming a ring of liquid as above explained, and the steam from the various boiling liquids will frequently force its way through the joints $o^4$, $o^4$. Such escape through these joints never happens when the space between the boiler sides and the condenser sides is of an equal thickness throughout, and when these sides are sufficiently near each other to make the intervening space a capillary space, as is represented in Figs. 2, 3 and 4, the last two of which represent practical boilers designed for domestic purposes.

Fig. 3, represents an ordinary kitchen boiler, having the usual projection (*c*) in the bottom to be received into a cooking stove or range, and to be supplied with a small amount of water (*e*) and the sides (*a, a′*) extending up to the joints (*o, o*) and forming a flange for the condensing apparatus to rest on.

D, is an air tube for the escape of air and vapor, while the water (*e*) is being heated up; afterward it is closed.

The condenser B, with its projecting flanges (*b*) and its condensing sides (*b′*) and its air pipe D, serve to condense on its bottom, B, portions of the steam from the water (*e*), and the aroma of whatever is boiled therein; while the cold water in the condensing apparatus, B, cools the surface of (*b′*) and the continual radiation of heat from the surface (*a′*) cools it below the temperature of steam (which is 212°); it results therefore from these two causes acting conjointly that a ring of condensed vapor is constantly maintained between the sides of the condenser and of the boiler and through which steam and the aroma aforesaid is prevented from escaping. Thus we have in the devices here described all the benefits of a removable cover to a kitchen boiler, coupled, on the other hand, with all the benefits arising from the boiling out of contact with the air, and preventing the aroma from escaping into the room, and through the upper parts of the house. For the escape of the odors of the cooking department from the basement of our ordinary dwelling houses into the halls and passages is one of the very greatest objections and evils of the domestic establishment, and these are entirely obviated by this apparatus. The apparatus shown in Fig. 4 is also capable of the same results as those above described.

There is another and most important result obtained by the above apparatus namely the making of concentrated solutions of meats or vegetables, such as meat teas, soups, and gravies, and other nutritive articles of the same class, by the use of condensed aroma and very small quantities of water; a combination of elements which I was the first to use, so far as I am informed. These results are peculiarly applicable to the construction of my apparatus. I have ascertained by repeated experiments that a half pint of water is enough to boil 13 to 15 lbs. of meat, perfectly, and produce from a pint, to or pint and a half, of the most delicate and rich gravy, from the mingling of the water and the juices of the meat extracted by the operation of boiling. Thus any degree of concentration is obtained, from the lightest meat teas, to the most concentrated jellies, as here described.

This domestic boiler for meats and vegetables may be used in the following manner: Having withdrawn the condensing apparatus by the handles, charge the boiler with the amount of meats and vegetables designed to be cooked and pour into the bottom thereof a half a pint—more or less—of water according to the degree of concentration of the meat juices designed to be made. The condenser is then inserted and charged with cold water to $\frac{3}{4}$ of the capacity and the boiling commenced. Should the condensing water become too warm to condense all of the steam within the boiler, then the contents must be removed and the condenser again charged with cold water. This may be done with a siphon as seen in section, in Fig. 6, where (*h, g, i,*) is a siphon in place, the leg (*h*) dipping into the water of the condenser. It is filled by applying the lips to (*g*) and forcing a sudden puff of air through the pipe (*g, i,*) and will run till the reservoir be exhausted, when the cold water is to be poured in to supply its place. If it be thought more desirable, or if the syphon be not at hand, then the contents of the condenser may be poured out by lifting off the top bodily and pouring out the water in the usual way.

Having fully described the means used for constructing a boiling and condensing apparatus in combination, and the manner of forming the water joint between the said boiler and condenser, and the devices used for operating the same, I would remark, I am aware that boilers with double sides have been made and used before, but never made in the manner nor for the purpose herein described; therefore,

What I claim as my invention and desire to secure by Letters Patent is—

The construction of the water joint by means of the combination of the sides (*a, a′,*) with the side (*b, b′*) in the manner and for the purpose substantially as set forth.

In witness whereof I have hereunto set my hand and seal.

GEO. S. G. SPENCE. [L. S.]

Witnesses:
THOMAS HIGGINS,
CHAS. H. SPENCE.